2,786,052

PROCESS OF PURIFYING CAPROLACTAM

Leonard W. F. Kampschmidt, Beek, Netherlands, assignor to Stamicarbon N. V., Heerlen, Netherlands No Drawing. Application October 28, 1955,
Serial No. 543,617

Claims priority, application Netherlands
November 4, 1954

4 Claims. (Cl. 260—239.3)

The present invention relates to the process of purifying caprolactam by treating it with hydrogen in the presence of a hydrogenation catalyst.

It is already well-known that caprolactam, in the molten state, can be purified by treating it with hydrogen under pressure in the presence of a hydrogenation catalyst. To carry out this method of purification, it is necessary to employ apparatus which is capable of withstanding high temperatures and pressures. Moreover, the catalyst has to be separated from the reaction product by adding water to the lactam, filtering the concentrated solution and, finally, recovering the lactam by distillation.

It is an object of the present invention to improve the process of purifying caprolactam by treating it with hydrogen in the presence of a hydrogenation catalyst in a manner which is simple to carry out and gives high yields of caprolactam of outstanding purity.

It is a further object to devise such a process in which impurities can be removed.

It is an additional object to carry out purification of the caprolactam while eliminating the necessity of using apparatus capable of withstanding high temperatures and pressures.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found according to the present invention that the foregoing objects can be realized and purification of caprolactam, containing impurities with hydrogen in the presence of a hydrogenation catalyst, may be carried out in a simple manner by passing the hydrogen through an aqueous solution of caprolactam at a temperature below the boiling point of said solution and subsequently recovering the caprolactam from the reaction liquid.

With the process of the invention, the impurities in the lactam are hydrogenated whereas the lactam remains unmodified. It is preferred to employ lactam concentrations of 15–30% by weight because these concentrations also are desirable when employing a pretreatment with ion-exchangers. In this way, the lactam may be subjected to a preliminary purification treatment which has a promoting effect upon the hydrogenation and tends to protect the catalyst.

As ion exchangers there can be used cation exchange resins containing strong acid groups such as sulfonated mono vinyl aromatic hydrocarbon-divinyl aromatic hydrocarbon copolymers and other sulfonated copolymers such as those mentioned in D'Alelio patent, 2,366,007, the entire disclosure of which is incorporated by reference, and sulfonated condensation products of phenols with aldehydes, e. g. sulfonated resorcinol-formaldehyde resin. Suitable anion exchangers for use in the present process are, for example, tertiary sulfonium bases of high molecular weight and quaternary ammonium bases of high molecular weight such as mono vinyl aromatic compound-divinyl aromatic compound copolymer which has been chloromethylated and then reacted with a tertiary amine to form the quaternary ammonium compound which is treated with a strong alkali to form the free base. Typical examples of such quaternary ammonium polymeric bases are shown in McBurney patent, 2,591,573, and Bauman patent, 2,606,098, the entire disclosures of which are hereby incorporated by reference. In the case where the ion exchangers are arranged in series with the anion exchanger placed at the end, it is frequently desirable to use a pH correction filter to neutralize the solution and prevent hydrolysis of the caprolactam into the corresponding amino acid in the otherwise alkaline solution.

In order to bind non-ionogenic impurities which may be present, use may be made of any of the well known surface active substances such as active carbon, bleaching earth and other adsorptive agents. These substances may be used in the form of a filter bed position before or after the ion exchangers.

Higher lactam concentrations of 40, 60 or even 90% by weight of lactam in the starting solution are also usable, but the higher concentration of the impurities in such solutions necessitates a more intensive hydrogenation treatment. Concentrations as low as 15% by weight of lactam also can be used.

The reaction temperature during the hydrogenation is kept below the boiling temperature of the lactam solution in order that the hydrogen will be properly distributed through the solution. Preferably, temperatures of 85–100° C. are employed but it is also possible to work at lower temperatures of, for example, 15–25° C. or at moderately elevated temperatures of 30–50° C.

Application of high pressures is not essential since the treatment may even be carried out at atmospheric pressure. It is therefore possible to use simple apparatus which need not withstand high pressures and temperatures. The hydrogen can be kept at a slight gauge pressure, e. g. 1–2 atmospheres, in order to promote the distribution of the hydrogen through the lactam solution.

The hydrogenation can be carried out with the aid of the customary hydrogenation catalysts, for example, metal catalysts such as iron, nickel, palladium, platinum and copper, or metal oxides such as molybdenum oxide, copper oxide, vanadium oxide, or mixtures of metals and/or metal oxides. The catalysts may be deposited on a carrier, for example, kieselguhr, diatomaceous earth, silicagel or aluminium oxide. The porous so-called foraminate catalysts are particularly suitable. These are prepared from alloys of metals such as nickel, cobalt, iron or copper with other metals such as aluminium or silicon, by partial removal of the latter from the alloys.

The catalysts can be suspended in the aqueous lactam solution in a pulverulent or granular form. In such case, however, the catalysts again have to be separated from the solution after the hydrogenation has been completed. Such separation can be by filtration. This operation is not required if the catalysts are present in the reaction vessel in the form of a fixed bed of coarse-grained catalyst particles and the lactam solution and the hydrogen are passed through the reaction chamber.

Recovery of the purified caprolactam from the reaction liquid may be carried out by distillation. Alternatively the reaction liquid can be passed over ion-exchangers such as those previously set forth to remove the hydrogenated impurities. The aqueous lactam solution can then be evaporated, if desired at a reduced pressure, e. g. 5 mm.

to 100 mm. to eliminate the water, without using a further distillation at high temperatures.

Since the process of the invention is carried out at a low temperature (it is possible for the entire treatment in the recovery of caprolactam from the reaction product obtained in the cyclohexanone oxim-caprolactam rearrangement, as well as the purification of the lactam, to be carried out at temperatures below 100° C.) the lactam is never exposed to high temperatures. In this way, high yields of caprolactam of outstanding purity are obtained that can be kept without discolouring and from which colorless polymerization products, such as fibres with excellent mechanical properties, can be prepared.

*Example*

An aqueous caprolactam solution containing 20% by weight of caprolactam, obtained from Beckmann rearrangement of cyclohexanone oxime was continuously passed through a set of three vertical cylindrical reaction vessels in series (height of each vessel 2 m., diameter 30 cm.) filled with hydrogenation catalyst. The catalyst used in these columns was palladium deposited on aluminium oxide (0.4% by weight of palladium).

The temperature in the reaction vessels was kept at 90° C. with the aid of a heating jacket through which steam was passed.

The velocity at which the lactam solution was led through was adjusted to 3 litres per litre of catalyst per hour.

The lactam solution was passed downwardly through the set of reaction vessels in countercurrent relation to hydrogen which, at the rate of 2 litres per litre of catalyst per hour (measured at 0° C. and 1 at.), was fed to the reaction vessels at the bottom ends thereof.

The lactam solution flowing from the reaction vessels was evaporated at a temperature of 70° C. and pressure of 50 mm. in an evaporator, in order to eliminate the water, and subsequently the lactam was subjected to a distillation at a temperature of 140° C. and a pressure of 5 mm.

The caprolactam was obtained in the form of a white crystalline mass in a yield of 200 grams per litre of starting solution. The product obtained was suitable for the manufacture of polymerisation products having good mechanical properties.

What I claim is:

1. In the process of purifying caprolactam by treating the caprolactam with hydrogen in the presence of a hydrogenation catalyst, the improvement comprising passing the hydrogen through an aqueous solution of the impure caprolactam at a temperature below the boiling point thereof, and recovering the caprolactam from the reaction liquid.

2. A process as claimed in claim 1, wherein the treatment is carried out at a temperature of 85–100° C.

3. A process as claimed in claim 1, wherein the caprolactam solution employed is a 15–30% solution by weight.

4. A process according to claim 1 wherein the hydrogenation is carried out at a pressure not over about 2 atmospheres gauge.

References Cited in the file of this patent

FOREIGN PATENTS

| | | |
|---|---|---|
| 703,019 | Great Britain | Jan. 27, 1954 |
| 904,162 | France | Feb. 19, 1945 |
| 1,087,137 | France | Aug. 18, 1954 |
| 748,291 | Germany | Oct. 31, 1944 |
| 891,548 | Germany | Sept. 28, 1953 |
| 504,774 | Belgium | Aug. 14, 1951 |